Jan. 5, 1943.       H. HARVEY       2,307,219
TYING MECHANISM
Original Filed Jan. 16, 1939    10 Sheets-Sheet 5
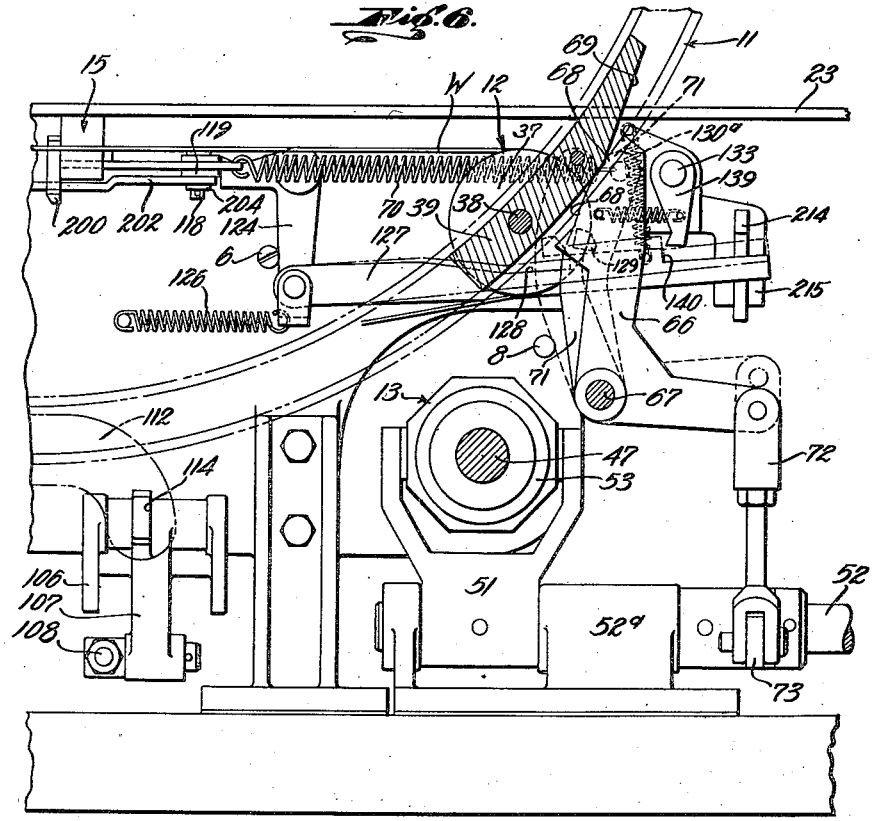
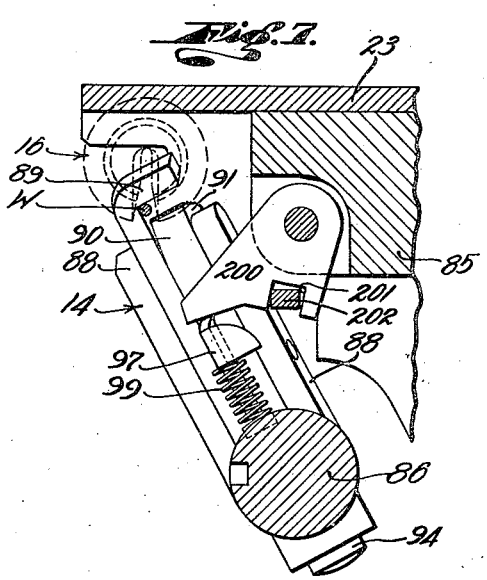
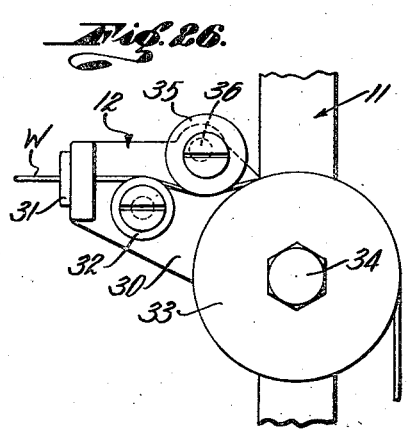
Inventor
HERBERT HARVEY
By
His Attorney

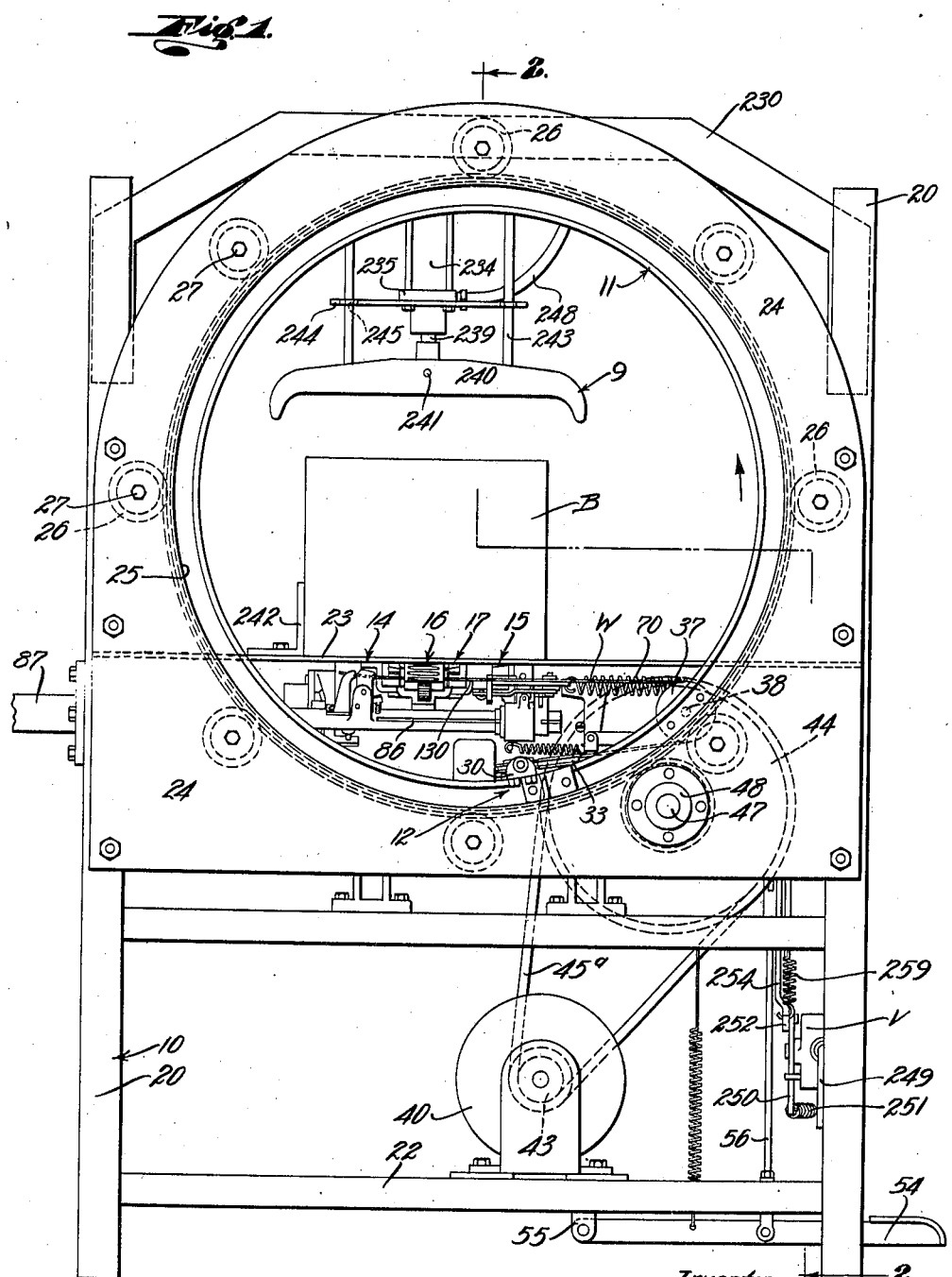

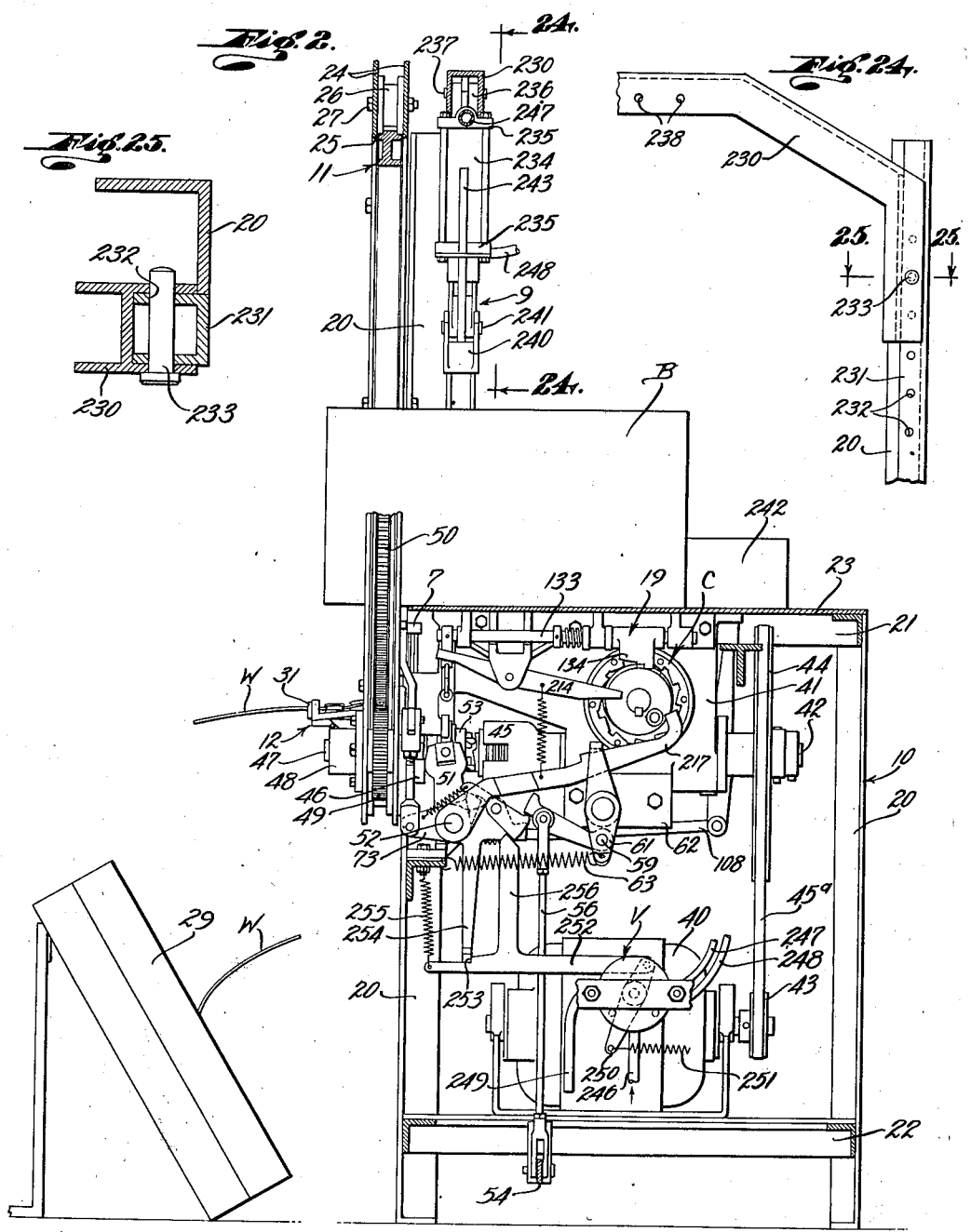

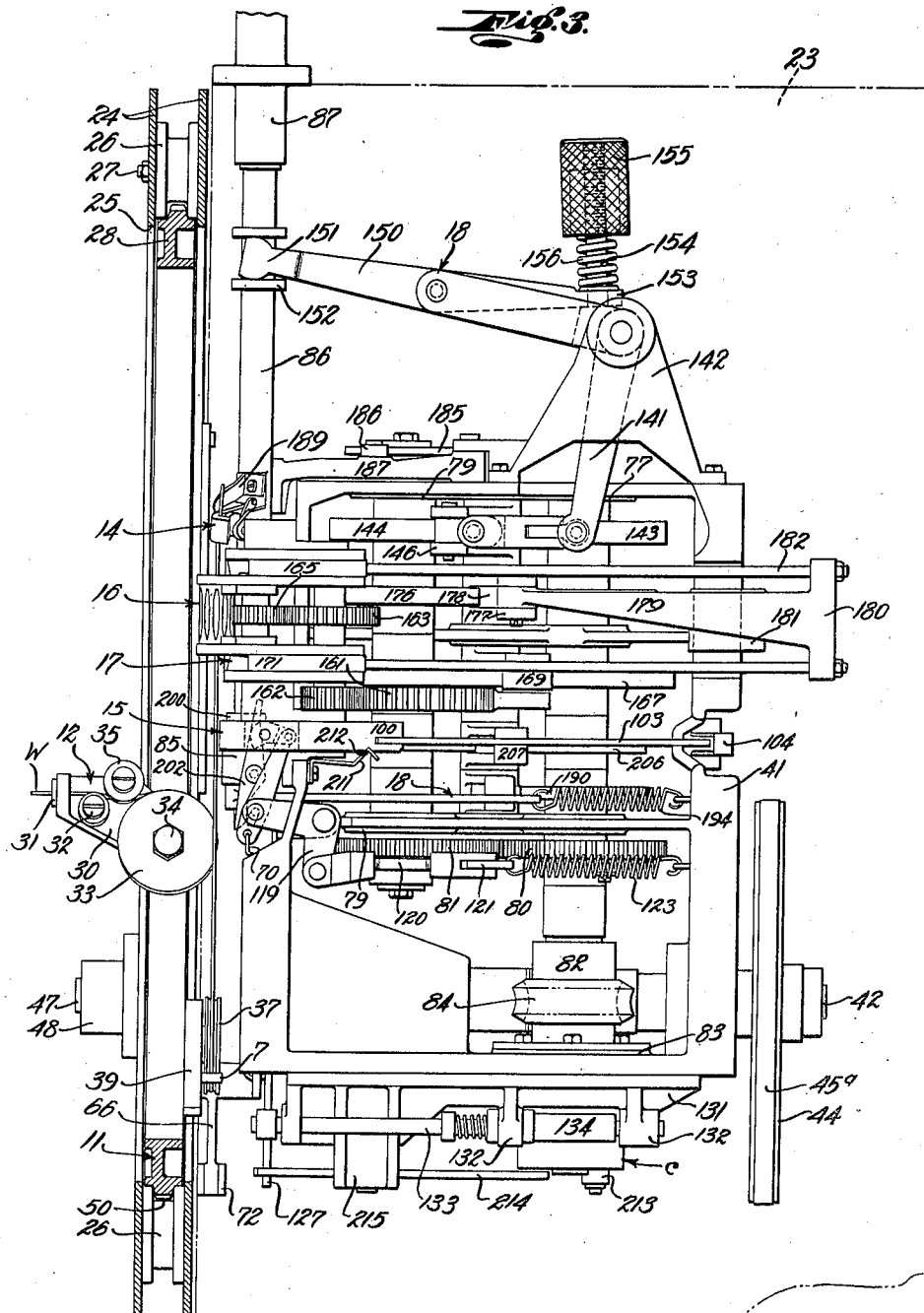

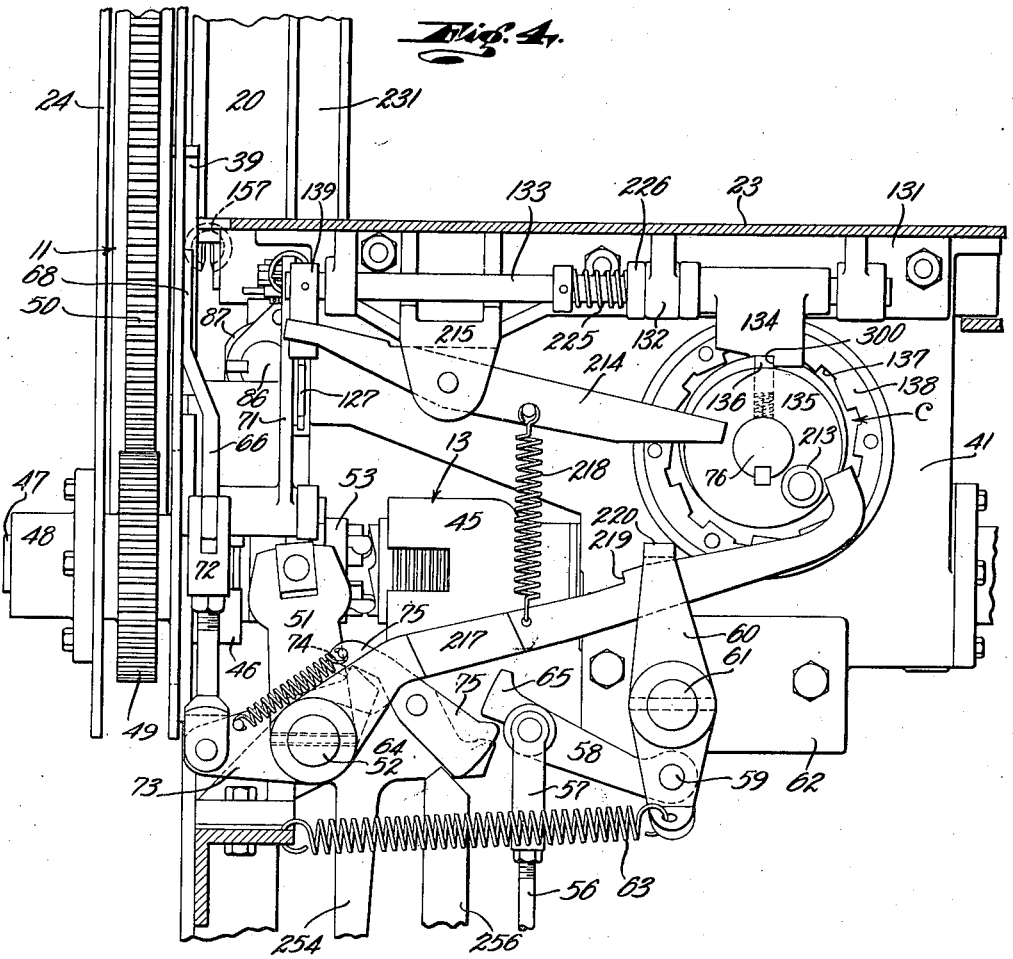
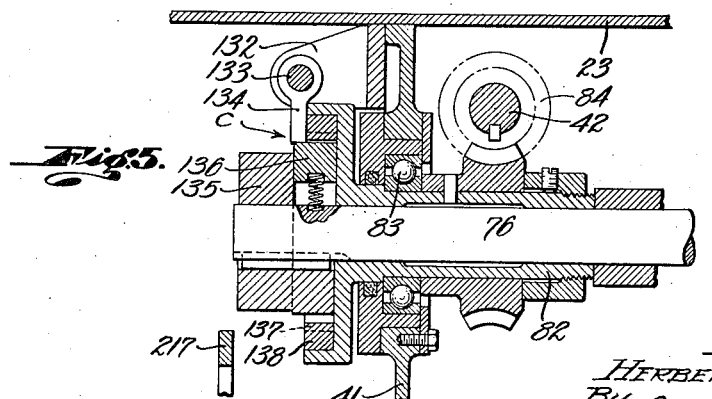

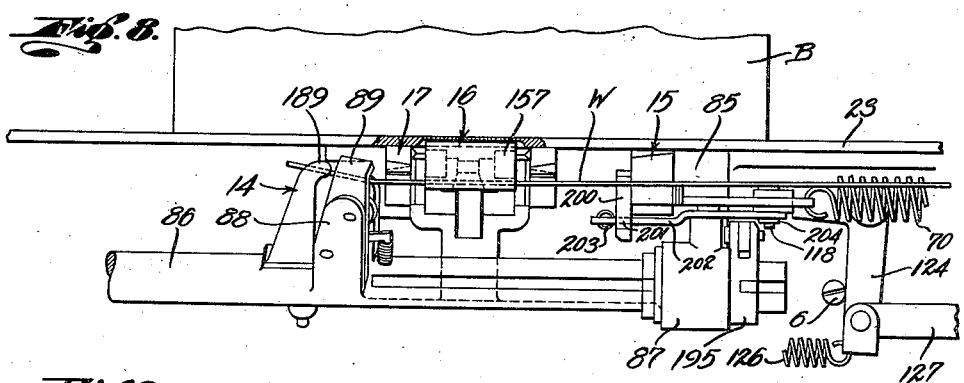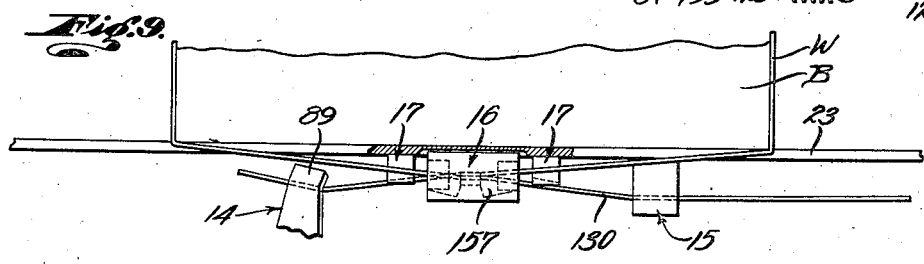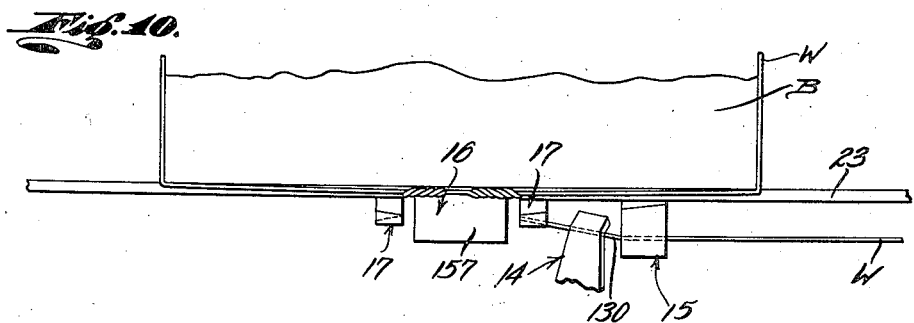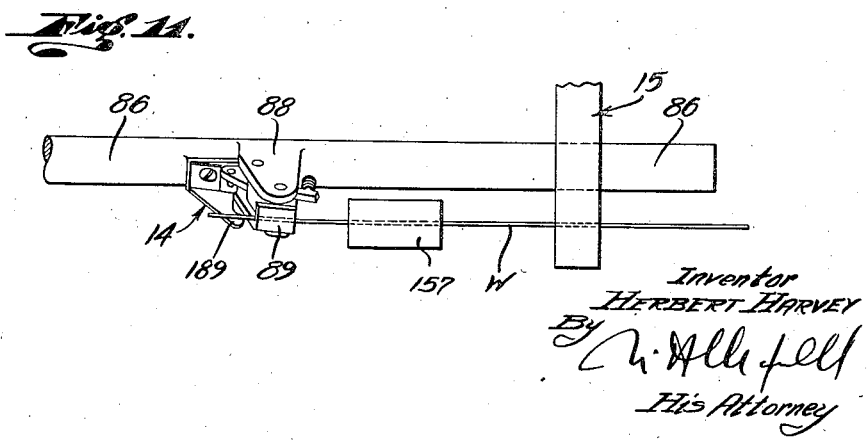

Jan. 5, 1943. H. HARVEY 2,307,219
TYING MECHANISM
Original Filed Jan. 16, 1939 10 Sheets-Sheet 7
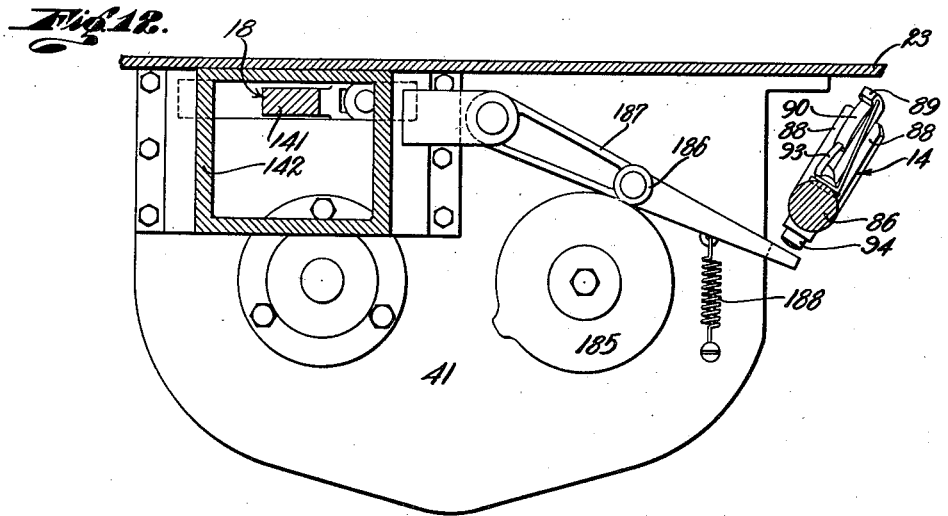
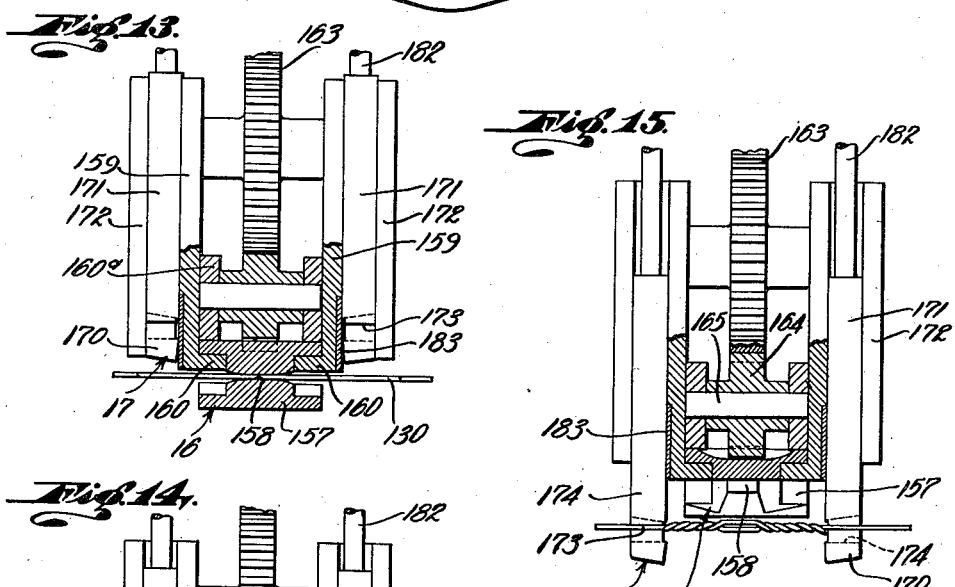
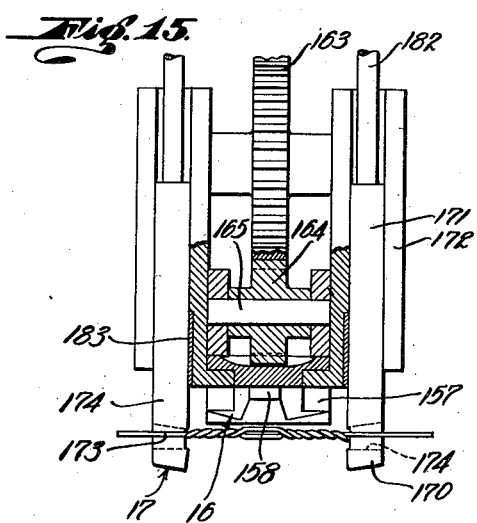
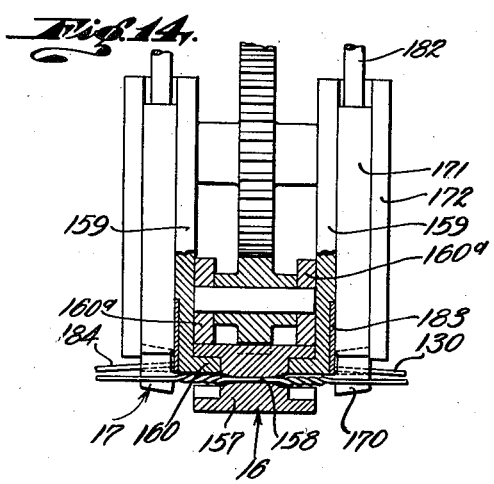
Inventor
HERBERT HARVEY
By
His Attorney

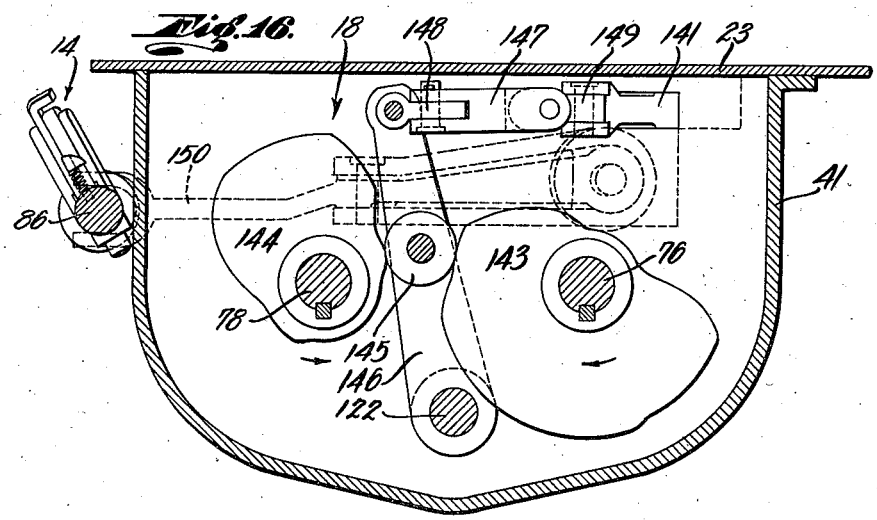
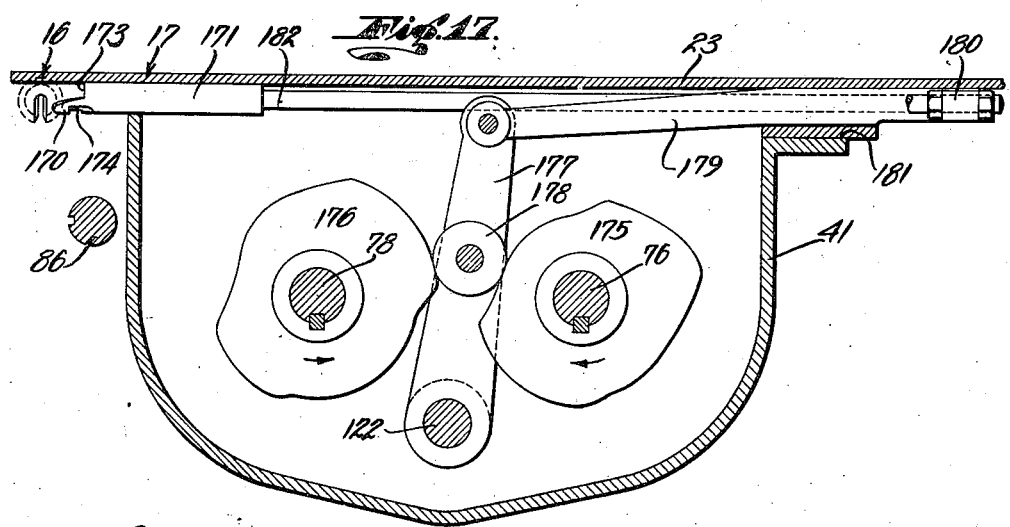
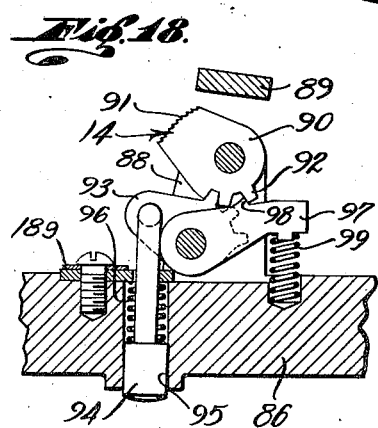

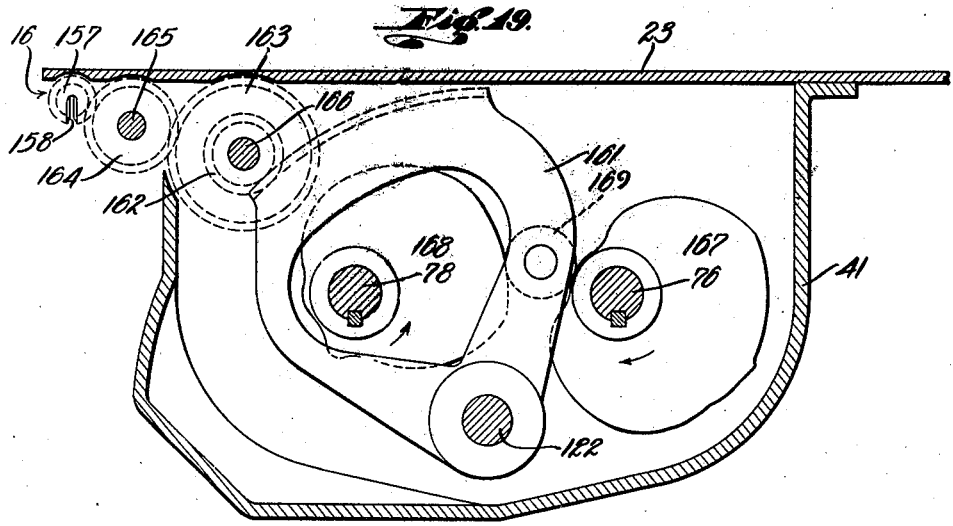
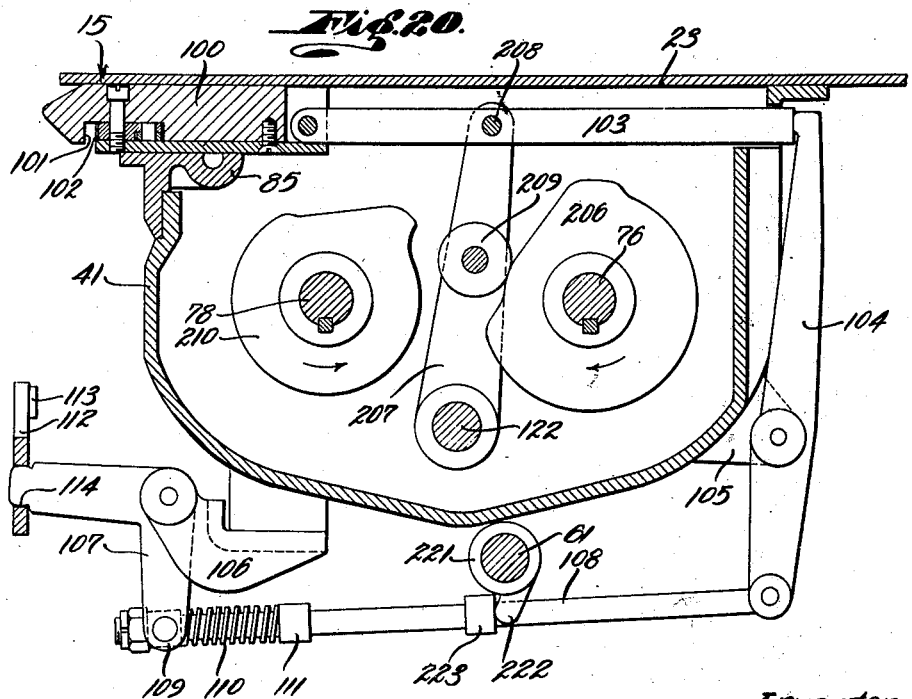

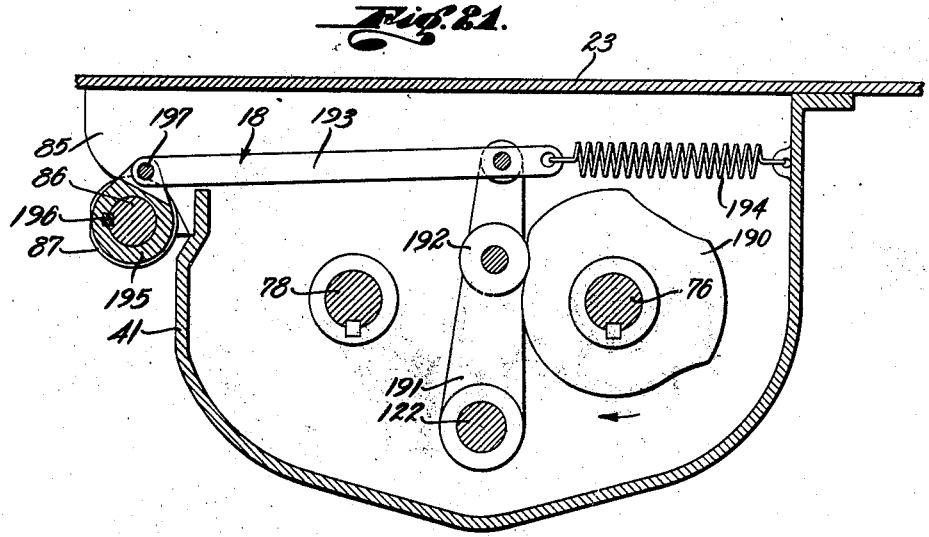
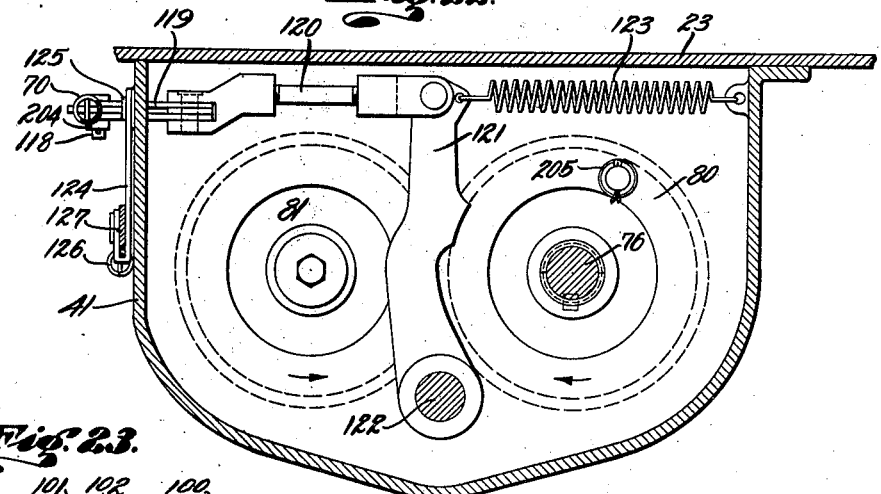
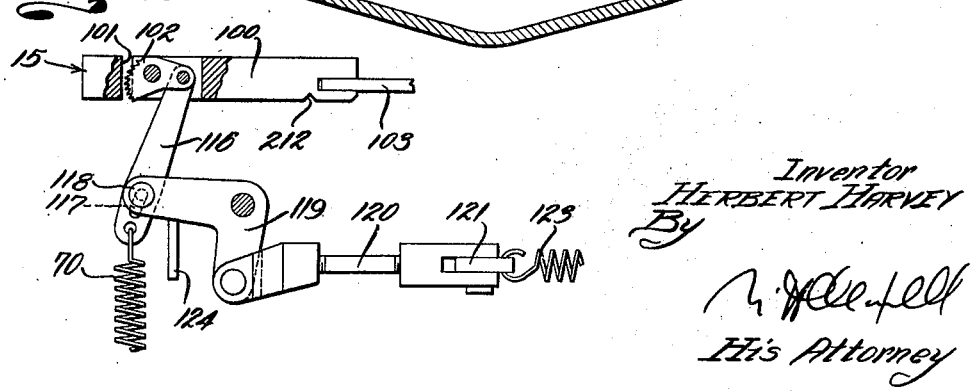

Patented Jan. 5, 1943

2,307,219

UNITED STATES PATENT OFFICE 2,307,219

TYING MECHANISM

Herbert Harvey, Los Angeles, Calif.

Original application January 16, 1939, Serial No. 251,125. Divided and this application April 2, 1941, Serial No. 386,473

15 Claims. (Cl. 140—93)

This invention relates to tying means and relates more particularly to tying mechanisms for embodiment in machines for binding bundles, boxes, cartons, etc. A general object of this invention is to provide a practical, effective and simplified tying mechanism of the character mentioned.

This application is a division of application Serial No. 251,125, filed January 16, 1939, entitled Tying machine.

Another object of this invention is to provide a tying mechanism embodying a novel rethreading means in which only one of the gripping units is operated or shifted to rethread the tie forming means.

Another object of this invention is to provide a tying mechanism embodying means operative at the completion of the tying and severing operations for shifting the first gripping unit from its normal position to a position where it receives the cut end of the wire from the second gripping unit and for then returning the first gripping unit to its normal position to automatically rethread the tie forming means and thus condition the mechanism for the next operation.

Another object of this invention is to provide a tie forming mechanism of the character referred to in which the first gripping means, which is shifted to effect rethreading of the tie forming means, is employed to maintain a suitable tension on the wire for the tying operation.

Another object of the invention is to provide a tying mechanism of the character mentioned in which one of the wire gripping means is given a shuttle movement and is controlled in timed relation to the other elements of the machine to tension the wire during the tying operation and to rethread the wire through the tie forming means at the completion of the tying and severing operations, thus eliminating separate tensioning and rethreading elements and making it unnecessary to shift the second gripping means.

A further object of this invention is to provide a tie forming mechanism of the character referred to that is automatic in operation and that requires a minimum of attention on the part of the operator.

The various objects and features of my invention will be fully understood from the following detailed description of a typical preferred form and application of my invention, throughout which description reference is made to the accompanying drawings, in which:

Fig. 1 is a side view of a machine embodying the features of this invention. Fig. 2 is a vertical sectional view of the machine taken substantially as indicated by line 2—2 on Fig. 1, showing the principal elements in elevation. Fig. 3 is an enlarged plan view of the machine with the top removed and showing the wire wrapping ring in horizontal cross section and illustrating the principal parts in elevation. Fig. 4 is an enlarged fragmentary end view illustrating the clutches and control parts. Fig. 5 is a fragmentary vertical detailed sectional view of one of the clutches, being a view taken as indicated by line 5—5 on Fig. 4. Fig. 6 is an enlarged fragmentary vertical detailed sectional view with the wire wrapping ring appearing in broken lines, being a view illustrating the cam actuated control elements. Figs. 1-6, inclusive, of the drawings, illustrate the parts in the normal or resting positions. Fig. 7 is an enlarged vertical detailed sectional view of the first gripping means showing it in position to grip the wire presented by the second gripping means. Fig. 8 is an enlarged fragmentary side elevation of the wire tying and gripping means showing the parts in the initial positions. Figs. 9, 10 and 11 are more or less diagrammatic views of certain of the wire gripping and tying parts illustrated in Fig. 8, showing the various positions of the second gripping means. Fig. 12 is an enlarged vertical sectional view illustrating the first gripping means. Fig. 13 is a fragmentary plan view showing parts of the tie forming means in horizontal cross section and illustrating the wire in position to be tied. Fig. 14 is a view similar to Fig. 13 showing the wire being severed following the tying operation. Fig. 15 is a view similar to Fig. 13 showing the tie being ejected from the wire tying means. Fig. 16 is an enlarged vertical sectional view illustrating the means for controlling and shifting the first gripping means for the rethreading operations. Fig. 17 is a view similar to Fig. 16 illustrating the means for controlling and actuating the wire separating, severing and tie ejecting means. Fig. 18 is an enlarged fragmentary longitudinal detailed sectional view of the first gripping means showing the gripping jaw held in the released or open position. Fig. 19 is an enlarged vertical sectional view illustrating the means for controlling and operating the wire tying means. Fig. 20 is an enlarged vertical sectional view of the second gripping means and the means for controlling and operating the same. Fig. 21 is an enlarged vertical sectional view of the means for turning or oscillating the carrier of the first gripping means during the rethreading operations. Fig. 22 is an enlarged vertical sectional view of the means for opening and closing the gripping jaw of the second gripping means. Fig. 23 is an enlarged fragmentary plan view of a portion of the means for controlling and operating the gripping jaw of the second gripping means. Fig. 24 is a fragmentary side elevation taken as indicated by line 24—24 on Fig. 2, illustrating the means for adjustably supporting the clamp carrying beam. Fig. 25 is an enlarged horizontal detailed sectional view taken as indicated by line 25—25 on Fig. 24, and Fig. 26 is an enlarged, fragmentary elevation view illustrating the wire training and tensioning means on the ring.

The machine embodying the features of the present invention may be said to comprise, generally, a supporting frame 10, a ring 11 rotatably mounted on the frame 10, wire training means 12 on the ring 11 engaging a wire W to wrap or train the wire about an object or box B when the ring 11 is rotated, means 13 for operating and controlling the ring 11, holding means 9 for holding the object or box B during the wire wrapping operation, a tie forming mechanism comprising spaced gripping means 14 and 15 for gripping the wire W, tie forming means 16 between the gripping means 14 and 15 operable to twist or form a tie in the wire W, means 17 for separating the wire W during the tie forming operation, for severing wire following the tie forming operation and for ejecting the completed tie from the means 16, means 18 for shifting and controlling the gripping means 14 to tension the wire W on the box B preparatory to the tying operation and to rethread the wire W at the completion of the tying operation, control means for the tie forming mechanism controlled by the ring 11 and various other parts and mechanism, the details and functions of which will be hereinafter described.

The supporting frame 10 carries the various parts of the machine and may be formed and proportioned to act as a table for supporting the articles or boxes B to be bound. The supporting frame 10 includes legs or uprights 20 and upper and lower horizontal members 21 and 22 extending between and connecting the uprights. The uprights 20 and the horizontal members 21 and 22 may be formed of angle iron. A plate or top 23 is provided on the upper side of the supporting frame 10. The upper side of the top 23 is preferably flat and horizontal to form a table or support for the object or box B being bound.

The ring 11 is a rotatable element provided to carry the means 12 which trains or wraps the wire W around the object or box B on the top 23. The ring 11 is a rigid continuous member and in the construction illustrated is rotatable about a fixed horizontal axis. Bearing means are provided on the frame 10 to carry the ring 11. Two uprights 20 of the frame 10 may be extended to project upwardly beyond the top 23 and vertical plates 24 are secured to the uprights 20. The plates 24 are shaped to define a horizontal opening 25 whose diameter is somewhat greater than the internal diameter of the ring 11. The ring 11 is arranged between the spaced plates 24 in concentric relation to the opening 25. An annular series of spaced rollers 26 carries the ring 11 for rotation. The rollers 26 are rotatably supported between the plates 24 by suitable pins or shafts 27 extending between the spaced plates. The ring 11 may have an external or peripheral flange 28 and the rims of the bearing rollers 26 may be grooved to receive the flange 28. The ring 11 has its major portion projecting above the top 23 and has a part extending below the top 23 at one edge of the top.

The means 12 is a shuttle means or wire handling means carried by the ring to train the wire about the box B, it being understood that the leading or cut end portion of the wire W is held by the first gripping means 14 during rotation of the ring 11. This function of the gripping means 14 will be hereinafter described. The means 12 is adapted to receive or handle the wire W extending from a supply drum or reel 29 suitably supported at a point spaced from the machine. The wire training or wrapping means 12 includes a bracket 30 secured to the ring 11. The bracket 30 projects outwardly or laterally from the ring 11 to protrude beyond the outer plate 24. An eye 31 is provided in the bracket 30 to receive and direct the incoming wire W. A roller 32 is rotatably supported on the bracket adjacent the eye 31 to receive and guide the wire as it leaves the eye. A second guide roller 33 of larger diameter is supported on a pin 34 projecting from the bracket 30 to be disposed within the ring 11. The wire W passes inwardly from the eye 31 to the roller 32, extends over the periphery of the roller 33, then leaves the roller 33 at the inner side of the ring 11.

A tensioning roller 35 is spaced between the guide rollers 32 and 33 and is disposed at the opposite side of the wire W. The tensioning roller 35 is rotatable on the eccentric portion of an adjustable pin 36 carried by the bracket 30. The roller 35 engaging the wire W at a point between the rollers 32 and 33 provides a drag on the wire W so that a desirable tension is placed on the wire as it is wrapped about the object or box B. By adjusting the shaft or pin 36 the tension thus put on the wire W may be varied.

The means 12 further includes a pulley or sheave 37 arranged at the forward or inner side of the rotatable ring 11. The sheave 37 turns about a substantially horizontal axis and is carried by a pin 38 projecting from a part 39 secured to the inner side of the ring 11. The wire W extends from the roller 33 to pass over the sheave 37 and then leaves the sheave 37 to extend to the tying mechanism. A pin or keeper 7 is provided adjacent the periphery of the sheave 37 for retaining the wire W on the sheave. With the ring in its initial or idle position illustrated in Fig. 1, the wire W extends substantially horizontally from the sheave 37 to the gripping means 14 and 15 and the tie forming means 16. The ring 11 is turned one complete revolution in the direction indicated by the arrow in Fig. 1 during each cycle of operation and the wire W engaged and directed by the means 12, as just described, is closely wrapped about the box B on the top 23 with suitable tension. The roller 37 bends the wire W as the ring 11 rotates to shape the wire in such a manner that the wire hugs the sides of the object or box B by reason of its resiliency and shape or curvature.

The means 13 for operating and controlling the wire training ring 11 is operable to rotate the ring one revolution in each cycle of operation of the machine. The means 13 is started by a manual operation and is stopped at the end of the revolution of the ring 11 by the action of a control part on the ring. The power means for operating the means 13 and the other elements of the machine may be in the nature of an electric motor 40 mounted in the supporting frame 10. A case 41 is hung or fixed in the upper portion of the supporting frame 10 and the means 13 includes a shaft 42 extending horizontally through the case 41. A drive is provided between the driving motor 40 and the shaft 42. This drive may comprise a pulley 43 on the shaft of the motor 40, a larger pulley 44 fixed to the shaft 42 and a belt 45ª operating over the pulleys 43 and 44.

The ring operating means 13 further includes a manually controlled and mechanically controlled clutch. This clutch may be of any selected or suitable type. In the drawings I have shown a two-unit type of clutch of the character disclosed in Patent No. 1,753,085, granted April 1, 1930. One unit 45 of the clutch has its outer, or female, part fixed or keyed to the shaft 42, while the other unit 46 of the clutch has its corresponding part fixed to the supporting frame 10 or to one of the plates 24 so that the unit 45 acts as a driving unit while the unit 46 serves as a holding or brake unit. A shaft 47 is rotatably supported by a bearing 48 on one of the plates 24 and extends into the clutch in coaxial relation to the shaft 42 and the units 45 and 46. A pinion 49 is fixed or keyed to the shaft 47 between the plates 24 and meshes with ring gear teeth 50 on the above described peripheral flange 28 of the ring 11. The pinion 49 and the ring gear teeth 50 provide a substantial speed reduction between the shaft 47 and the ring 11.

The clutch of the means 13 includes a yoke 51 fixed or keyed to a shaft 52 turnably supported by bearings 52ª on the frame 10. The yoke 51 engages the shiftable element 53 of the clutch and is movable to shift the element 53 between a position where it engages or clutches the shaft 47 with the driving or rotating unit 45 and a position where it clutches or engages the shaft 47 with the stationary unit 46. With the yoke 51 and element 53 in the positions illustrated in Figs. 2 and 4, the element 53 clutches the shaft 47 with the stationary unit 46 so that the ring 11 is held against rotation in a position where the wire W extends substantially horizontally from the sheave 37 to the gripping means 14 and 15 and the tie forming means 16.

The means 13 for operating and controlling the ring 11 further includes a manual control or operating means for the above described clutch. The manual operating means includes a pedal 54 pivotally carried by a bracket 55 on the frame structure and projecting outwardly from the frame 10 to be readily depressed by the operator. A link or rod 56 has a suitable pivoted yoke connection with the pedal 54 and extends upwardly in the supporting frame 10. A yoke 57 on the upper end of the rod 56 is pivotally connected with a lever 58, see Fig. 4. The lever 58 is pivotally carried by a pin 59 on a lever 60 which in turn is fixed to a shaft 61 pivotally carried by a suitable bracket 62. The lever 60 is normally held against movement by a spring 63 and the function and operation of the lever 60 will be subsequently described. The means 13 further includes an arm or lever 64 keyed or fixed to the yoke shaft 52 and engageable by a lug 65 on the above described lever 58. Upon depression of the pedal 54 the lug 65 engages the lever 64 to pivot the lever and thus turn the shaft 52 to shift the yoke 51 in a direction to engage the element 53 with the driving unit 45. This results in rotation of the shaft 47 and turning of the wire training ring 11.

The operating means 13 for the ring 11 further includes means for disengaging or declutching the shaft 47 from the drive shaft 42 and for engaging the clutch element 53 with the stationary clutch unit 46 to stop the ring 11 and to hold the ring against rotation. The means for stopping the ring 11 at the completion of its revolution includes a bell crank 66 pivotally supported by a pin 67 projecting from the inner plate 24 (see Fig. 6). The bell crank 66 has a sloping finger 68 at its upper end engageable by a cam face 69 on the ring 11. The cam face 69 may be provided on the part 39 referred to above. A spring 70 is connected with a second finger 71 on the upper end of the bell crank 66 and holds the bell crank in position to have its finger 68 engaged by the cam face 69. The lower arm of the bell crank 66 has a pivotal connection with a link 72. The link 72 in turn has a pivotal connection with a lever 73 freely pivoted on the yoke shaft 52. A releasable latch connection is provided between the above described lever 64 and the lever 73. This latch connection includes a shoulder 74 on the inner arm of the lever 73 and a latch 75 pivoted on the lever 64 and cooperable with the shoulder 74, see Fig. 4. The outer or lower finger of the latch 75 is engageable by the lug 65 of the lever 58 when the pedal 54 is depressed whereby depression of the pedal serves to release the latch 75 and thus disengage the lever 64 from the lever 73.

With the wire wrapping or training ring 11 in its idle position illustrated throughout the drawings, the cam face 69 is in engagement with the finger 68 to hold the bell crank 66 and its associated elements in position where the clutch element 53 is in cooperation with the stationary clutch unit 46. As above described, the engagement of the shiftable clutch element 53 with the clutch unit 46 holds the ring 11 against rotation. Upon depression of the pedal 54 by the operator the latch 75 is released from the shoulder 74 just before the yoke 51 is shifted to engage the clutch element 53 with the driving clutch unit 45. When the ring 11 begins to turn the cam face 69 moves out of engagement with the finger 68 of the bell crank 66 and the spring 70 returns the bell crank to a position against a stop 8. Return movement of the bell crank 66 is accompanied by movement of the link 72 and movement of the lever 73, the lever 73 moving to a position where its shoulder 74 reengages the latch 75. Thus the latch 75 is reconditioned as soon as the cam face 69 and the part 39 pass the bell crank finger 68.

When the wire wrapping or training ring 11 approaches the end of its revolution the cam face 69 moves into engagement with the finger 68 to cause pivoting of the bell crank 66. The bell crank is pivoted to move the link 72 downwardly and to pivot the lever 73. The latch 75 carried by the lever 64 and cooperating with the shoulder 74 transmits the movement from the lever 73 to the lever 64 so that the yoke 51 is moved to shift the clutch element 53 away from the driving unit 45 into engagement with the stationary braking unit 46. This engagement of the clutch element 53 with the unit 46 stops rotation of the ring 11. The ring 11 is stopped in a position where the wire W passes substantially horizontally from the sheave 37 to the gripping means 14 and 15 and the tie forming means 16. It is to be observed that the means 13 described above produces one complete revolution of the wire wrapping or training ring 11 when the operator depresses the pedal 54 and assures the return of the ring to its normal position when the wire W has been effectively wrapped about the object or box B on the top 23.

The means 9 is provided to securely hold the object or box B against movement during the above described wire training or wrapping operation. The means 9 may be a fluid pressure operated means, say a pneumatic means and is automatically or mechanically put into operation substantially simultaneously with the initiation of the wire wrapping operation, just described, and is automatically or mechanically retracted at the completion of the wire wrapping operation.

The object or box holding means 9 includes a beam 230 shiftably guided and supported by guides 231 on the upwardly extending frame uprights 20. The beam 230 is adjustable vertically to adapt the means 9 to hold boxes and objects of different heights. Spaced openings 232 are provided in the guides 231 and pins 233 and passed through openings in the beam 230 and through selected pairs of openings 232 to support the beam in the selected elevation, see Fig. 24. The means 9 further includes a vertically disposed cylinder 234 carried by the beam 230 and projecting downwardly from the beam. The opposite ends of the cylinder 234 are closed by caps or heads 235. A bracket 236 on the upper cylinder head 235 is secured to the beam 230 to connect the cylinder with the beam. In the preferred construction the cylinder 234 is carried by the beam 230 for horizontal adjustment. The cylinder bracket 236 is secured to the beam 230 by a pin 237 adapted to extend into any one of a plurality of horizontally spaced pairs of transverse openings 238 in the beam 230 to mount or support the cylinder 234 in the selected position.

A ram or plunger 239 projects downwardly through the lower cylinder head 235 and carries a work-engaging member 240. A pivot pin 241 secures the member 240 to the plunger 239 for pivoting about a horizontal axis. The box engaging member 240 may be formed of channel iron and is preferably shaped to evenly engage the upper sides of the articles or boxes B being handled by the machine. In practice downturned fingers may be provided on the opposite ends of the box engaging member 240. The member 240 being pivoted on the plunger 239 may accommodate itself to the shape and disposition of the box B on the top 23. A flange 242 is provided on the top 23 to locate the box B for proper engagement by the member 240. It is preferred to provide means for preventing rotating of the member 240 and plunger 239. Spaced pins or rods 232 are fixed to the member 240 and project upwardly from the member to pass at opposite sides of the cylinder 234. A horizontal plate 244 is secured to the lower cylinder head 235 and has slots 245 shiftably passing the rods 243. The cooperation of the rods 243 with the slots 245 prevents turning of the member 240 about a vertical axis and allows the member 240 to pivot on the pin 241 to accommodate itself to the box B on the top 23.

The means 9 further includes an automatic control whereby depression of the pedal 54 causes downward actuation of the member 240 against the box B and whereby the member 240 is raised from the box B when the wire wrapping ring 11 approaches the end of its travel. The control and actuating means for the means 9 includes a pipe 246 leading from a suitable source of air under pressure (not shown) and extending to a valve V. The valve V may be suitably mounted in the supporting frame 10. A pipe 247 extends from the valve V to the upper end of the cylinder 234 and a similar pipe 248 extends from the valve V to the lower end of the cylinder 234 (see Fig. 2). The valve V has an exhaust 249. An operating lever 250 is provided on the valve V and is shiftable between a position where the pipe 248 is in communication with the pipe 246 and the pipe 247 is in communication with the exhaust 249 and a position where the pipe 247 is in communication with the supply pipe 246 and the pipe 248 is in communication with the exhaust 249. Suitable stops on the valve V stop the lever 250 in its two positions. A spring 251 may be connected with the valve lever 250 to normally urge the valve lever to the position where the pipe 247 leading to the upper end of the cylinder 243 is in communication with the supply pipe 246.

A suitable control member 252 is pivotally connected with the valve lever 250 and is provided with a shoulder 254 (see Figs. 2 and 4). The above described lever 64 has a depending finger 254 cooperating with the shoulder 253 on the member 252. A spring 255 may initially hold the member 252 in a position where its shoulder 253 cooperates with the finger 254. The control member 252 has an upwardly extending projection 256 engageable by the above described latch 75. When the pedal 54 is depressed by the operator the latch 75 is moved downwardly by the part 65 to engage the upper end of the projection 256. This engagement results in downward shifting of the member 252 and disengagement of the shoulder 253 from the finger 254. Upon the release of the shoulder 253 from the finger 254 the spring 251 turns the valve lever 250 and shifts the control member 252. The spring 251 turns the valve lever 250 to a position where the pipe 247 is in communication with the supply pipe 246 and the pipe 248 has communication with the exhaust 249. Thus air under pressure is supplied to the upper end of the cylinder 234 to shift the member 240 downwardly into clamping or holding engagement with the box B. When the shoulder 253 is disengaged from the finger 254, as just described, the member 252 rides under the lower end of the finger 254.

The means 9 for holding the box B is put into operation to securely clamp the box B against movement on the top 23 immediately before or substantially simultaneously with the engagement of the clutch element 53 with the driving clutch unit 45 so that the means 9 operates to clamp the box B in position just preceding the start of rotation of the wire training ring 11. When the ring 11 approaches the end of its travel the cam face 69 operates the bell crank 66 and the shaft 52 to disengage the clutch element 53 from the drive clutch unit 45 as described above. As the lever 64 is keyed or fixed to the clutch yoke shaft 52 the shifting of the member 53 through the action of the cam face 69 is accompanied by turning of the lever 64 and movement of the finger 254. The lower end of the finger 254 cooperates with the shoulder to shift the control member 252 and thus turn the valve lever 250. The valve lever 250 is returned to its initial position by this action, putting the pipe 247 in communication with the exhaust 249 and putting the pipe 248 in communication with the supply pipe 246. The air under pressure admitted to the lower end of the cylinder 234 raises the box engaging member 240 and returns the member to its normal raised position illustrated in Figs. 1 and 2. Thus the means 9 is retracted and disengaged from the box B at the end of travel of the ring 11.

The tie forming mechanism of the invention comprises the gripping means 14 and 15, the wire twisting or tying means 16, the means 17 for holding the wire W separated and stationary during the tying operation, for severing the wire at the completion of the tying operation and for ejecting the completed tie, the means 18 for shifting the gripping means 14 to rethread the mechanism and the appropriate mechanisms for controlling and operating these means in the correct timed relation. The tie forming mechanism is mechanically put into operation at the completion of the wire wrapping or training operation of the ring 11 and follows through its several operations in a given sequence to produce a secure tie in the loop of wire W trained about the box B. A feature of the tie forming mechanism is the means 18 for controlling and operating the gripping means 14 in timed relation to the operation of the other elements to rethread the mechanism at the completion of its series of movements and operations so that it is unnecessary for the operator or workman to handle the wire W to rethread the machine.

The tie forming mechanism is preferably carried within the supporting frame 10 below the top 23 and may be driven or operated by the above described motor 40. The tie forming mechanism includes a main shaft 76 extending horizontally within the case 41 and supported by suitable bearings 77. A second shaft 78 is supported by bearings 79 to be in spaced parallel relation to the main shaft 76. Meshing gears 80 and 81 fixed to the shafts 76 and 78 form a drive between the shafts. A clutched drive is provided between the shaft 42 and the main shaft 76 of the tie forming mechanism. This drive includes an outer part or drive sleeve 82 carried by a suitable bearing 83 on the case 41 and driven by the shaft 42 through suitable speed reduction gearing 84, see Fig. 5. The shaft 76 extends through the sleeve 82 and a suitable single revolution clutch C is provided to engage or clutch the shaft 76 with the drive sleeve 82. The clutch C illustrated in the drawings will be later considered in detail. A casting or bracket 85 is fixed to the case 41 adjacent the ring 11 to carry various elements of the tie forming mechanism.

The first active or wire engaging means of the tie forming mechanism is the gripping means 14. The first gripping means 14 operates to grip and hold the free or cut end portion of the wire W throughout the tie forming operations and is controlled and shifted by the means 18 to rethread the tie forming mechanism for the succeeding operation. The gripping means 14 is carried by a shiftable and turnable rod or carrier 86 and is best illustrated in Figs. 7 and 18. The rod or carrier 86 is horizontally arranged and is supported to shift axially and to oscillate or turn about its longitudinal axis. The carrier 86 may be supported by suitable bearings 87 on the frame 10 and the bracket 85 and is arranged to extend across a side of the frame 10 adjacent the inner plate 24 and below the top 23.

The rod or carrier 86 is provided with a pair of spaced generally parallel projecting arms 88, see Figs. 7 and 11. A suitable hardened wear-resisting plate is fixed to the inner side of one of the arms 86 and has an inturned outer portion forming the anvil part 89 of the gripping means 14. A dog or jaw 90 is pivotally supported between the arms 88 and has a eccentric toothed active face 91 adapted to oppose the anvil part 89 to grip the wire W (see Figs. 7 and 18). Gear teeth 92 are provided on the gripping jaw 90 and a control pinion or dog 93 is pivotally supported between the arms 88 to have its teeth in cooperation with the teeth 92. A plunger 94 is pivotally connected with the control dog 93 and extends downwardly through an opening 95 in the carrier 86 to project from the surface of the carrier. A compression spring 96 in the opening 95 acts on the plunger 94 to pivot the dog 93 and to urge the jaw 90 into the wire gripping relation to the anvil part 89.

A latch means is provided to hold the gripping jaw 90 in the released condition. A lever or pawl 97 is pivotally supported between the arms 88 in adjacent relation to the dog 93 and a tooth or lug 98 projects from the pawl 97 to cooperate with the teeth 92. A spring 99 is arranged under compression between the pawl 97 and the carrier 86 to urge the pawl 97 to a position where its lug 98 holds the gripping jaw 90 retracted. The pawl 97 projects beyond the arms 88 to be engaged by another element of the machine as will be subsequently described. The carrier 86 is normally in a position where the arms 88 project in an upward direction in spaced relation to one end of the tie forming means 16. The jaw 90 of the gripping means 14 initially grips the free or cut end part of the wire W and the wire W is stretched or trained between the gripping means 14 and the sheave 37 to pass through the twisting means or tie forming means 16 and to pass in front of the second gripping means 15. The elements and mechanisms for operating and controlling the gripping means 14 will be hereinafter described.

The second gripping means 15 is provided to grip the wire W adjacent the tie forming means 16 and the means 17 during the tie forming, wire severing and tie ejecting operations and until the first gripping means 14 has re-engaged the wire W for the rethreading operation. The second gripping means 15 is located adjacent one side or end of the tie forming means 16, the first gripping means 14 being located at one side or end of the tie forming means 16 and the second gripping means 15 being located adjacent the other side or end of the tie forming means. The second gripping means 15 includes a block-like body 100 shiftably carried by the bracket 85 (see Figs. 20 and 23). The body 100 may be supported and guided in a channel in the bracket 85 to have horizontal movement. A spring latch 211 cooperates with a notch 212 in the body 100 to initially hold the second gripping means 15 in a retracted position (see Fig. 3). The outer end portion of the body 100 is adapted to project from the bracket 85 to be in engaging relation to the wire W and the outer end of the body 100 is bevelled or pointed to assist in clearing or guiding the wire. The lower portion of the body 100 is notched or recessed to provide the body with an inwardly facing anvil part 101. A gripping jaw 102 is pivotally supported in the notched lower side of the body 100 and has a toothed eccentric face adapted to oppose the anvil part 101 and adapted to grip the wire W. The gripping means 15 is initially retracted clear of the wire W and remains retracted during the wire wrapping or wire training operation of the ring 11.

The second gripping means 15 is moved outwardly into the wire engaging position when the ring 11 approaches the end of its revolution.

The means for projecting the gripping means 15 includes a link 103 pivotally connected with the rear end of the gripper body 100 and extending inwardly through the case 41. A lever 104 is pivotally carried by a bracket 105 on the exterior of the case 41 and has its upper end in cooperation with the link 103. A bracket 106 on the lower forward portion of the case 41 carries a pivoted bell crank 107. A link 108 is pivotally connected with the lower end of the lever 104 and extends forwardly to the lower arm of the bell crank 107. A yielding connection is provided between the link 108 and the bell crank 107. A yoke 109 on the bell crank 107 engages about the link 108 and a compression spring 110 is engaged between the yoke 109 and a shoulder 111 on the link to provide for the transmission of movement from the bell crank to the link. The bell crank 107 has an upper arm projecting outwardly or forwardly toward the adjacent plate 24.

The cam face 69 on the ring 11 operates the linkage just described to project the gripping means 15 before it cooperates with the bell crank finger 68 to effect the release of the clutch element 53 of the means 13. A shoe 112 is pivotally supported by a pin 113 on the inner plate 24 and extends to the bell crank 107. An opening 114 in the outer portion of the shoe 112 receives a reduced part of the forward or upper arm of the bell crank 107. The shoe 112 is located in the path of travel of the part 39 to be engaged by the cam face 69. When the cam face 69 engages the shoe 112 the shoe is pivoted downwardly so that the bell crank 107 is pivoted, the link 108 is shifted and the lever 104 is pivoted to project the gripper body 100. This brings the means 15 to its active wire engaging position.

The gripping jaw 102 of the second gripping means 15 is actuated to grip the wire W following the projection of the body 100 as just described. This actuation of the gripping jaw 102 follows or is substantially simultaneous with the stopping of the wire wrapping ring 11. The means for controlling and actuating the jaw 102 of the gripping means 15 includes a link 116 pivotally connected with the tail of the jaw 102 (see Figs. 22 and 23). A slot 117 in the link 116 receives a pin 118 on a bell crank 119. The bell crank 119 may be suitably supported on the case 41. A link 120 is pivotally connected with the inner arm of the bell crank 119 and extends rearwardly in the case 41 to an upstanding lever 121. The lever 121 is pivotally supported on a shaft 122 arranged in spaced parallel relation to the shafts 76 and 78. A spring 123 is connected with the lever 121 to urge the link 120, lever 121 and bell crank 119 rearwardly. The spring 70 is attached to the link 116 to urge the jaw 102 to the wire gripping position.

The invention includes a control means for initially holding the gripping jaw 102 against actuation, which control means is actuated or released by the cam face 69 on the rotating ring 11. The control means for governing the actuation of the gripping jaw 102 includes a bell crank 124 pivotally supported by a pin 125 on the side of the case 41, see Fig. 6. The bell crank 124 has an upper arm normally engaging the edge of the above described bell crank 119. A spring 126 is connected with the bell crank 124 to normally hold its upper arm in a position in cooperation with the edge of the bell crank 119 and its lower arm against a stop 6 on the side of the case 41. A control member 127 is pivotally secured to the lower arm of the bell crank 124 and extends from the bell crank 124 to a point beyond the bell crank 66. A notch 128 is provided in the upper edge of the member 127 and is adapted to receive a lug 129 on the finger 71 of the bell crank 66. Spring means 130ª is provided to yieldingly hold the member 127 in a position where the notch 128 may receive the lug 129.

When the cam face 69 moves past or out of cooperation with the finger 68 at the start of the rotation of the ring 11 the spring 70 moves the bell crank 66 to a position where the lug 129 is received in the notch 128. When the wire wrapping or training ring 11 completes its revolution the cam face 69 cooperates with the finger 68 to pivot the bell crank 66 as described above to stop rotation of the ring 11. During this last mentioned pivotal movement of the bell crank 66 the lug 129 cooperates with the notch 128 to move the member 127 and to pivot the bell crank 124. This movement of the bell crank 124 moves it free of the bell crank 119. When the bell crank 124 is disengaged from the bell crank 119 the spring 70 operates the link 116 to move the gripping jaw 102 into gripping engagement with the wire W. From this it will be seen that the gripping means 15 is actuated to grip the wire W subsequent to the projection of the means 15 and at the completion of the wire wrapping operation of the ring 11.

As described above, the first gripping means 14 grips and holds the cut end portion of the wire W prior to and during the wrapping of the wire around the article or box B and the gripping means 15 remains in a retracted condition during the wrapping of the wire around the box. When the ring 11 approaches the end of its travel the gripping means 15 is projected and is controlled or operated to grip the portion 130 of the wire W extending from the means 12 to the tie forming means 16. Just before the ring 11 reaches the end of its movement the means 15 moves out and the portion 130 of the wire W rides over the pointed end of the body 100 and snaps into position against the anvil part 101 and the jaw 102 is released as described above, to grip the wire. Thus, at the completion of the wrapping of the wire W around the box B the gripping means 14 and 15 are in gripping engagement with the opposite ends of the loop of wire engaging about the box and the overlapping portions of the wire loop are entered in the tie forming means 16 to be twisted together to form a tie.

The invention includes means for engaging the clutch C when the ring 11 approaches or reaches the end of its movement, the engagement of the clutch C putting the various elements of the tie forming mechanism into operation. The clutch controlling or actuating means is operated or controlled by the cam face 69 on the ring 11. A bracket 131 is secured to an end of the case 41 and has bearings 132 rotatably supporting a substantially horizontal shaft 133 (see Fig. 4). A blade 134 is fixed or keyed to the shaft 133 and normally projects downwardly at the clutch C. A collar 135 is keyed to the shaft 76 and a spring-urged dog 136 is shiftably keyed in a radial notch in the collar. The dog 136 is adapted to engage in any one of a plurality of internal notches 137 in a drum 138 fixed on the sleeve 82. The blade 134 initially cooperates with the clutch dog 136 to hold the dog retracted and clear of the drum 138.

An arm 139 is fixed to an end portion of the shaft 133 and is normally positioned to be in the path of a shoulder 140 on the control member 127. When the cam face 69 pivots the bell crank 66 to shift the control member 127 at the end of travel of the ring 11 the shoulder 140 cooperates with the arm 139 to pivot the shaft 133. This shifts the blade 134 out of engagement with the dog 136 and the dog is freed to engage in one of the notches 137. The engagement of the dog 136 in one of the notches 137 clutches the shaft 76 with the driving sleeve 82 to initiate rotation of the various cam elements, etc., of the tie forming mechanism. It is to be observed that the clutch C is engaged substantially simultaneously with the projection and release or actuation of the gripping means 15.

Novel means is provided to put additional tension on the wire loop engaged about the box B prior to the formation of the tie in the wire W to assure the tight binding of the box. The tensioning means acts on or shifts the first gripping means 14 subsequent to the projection and actuation of the gripping means 15 so that one end of the wire loop engaged about the box B is anchored by the means 15 while the other end is shifted by the means 14 to impose the additional tension on the loop. The wire tensioning means includes a bell crank 141 pivotally carried by a bracket 142 projecting from an end of the case 41 (see Fig. 3). One arm of the bell crank 141 projects into the case 41 for actuation by cam means in the case. Cams 143 and 144 are keyed to the shafts 76 and 78, respectively, and engage a roller 145 rotatably supported by a lever 146 pivoted on the shaft 122. An operative connection is provided between the upper end of the roller lever 146 and the inner arm of the bell crank 141. A link 147 has a universal connection 148 with the upper end of the lever 146 and has a similar universal connection 149 with the inner arm of the bell crank 141 (see Fig. 16).

The wire tensioning means further includes a novel spring loaded connection between the bell crank 141 and the carrier 86 of the first gripping means 14 (see Figs. 3 and 16 of the drawings). This spring loaded connection includes a double-armed lever 150 pivotally carried by the outer arm of the bell crank 141. The outer arm of the bell crank 141 may be divided or yoked to receive the inner arm of the lever 150. A yoke 151 on the outer arm of the lever 150 engages between shoulders 152 on the carrier 86 to transmit movement from the lever 150 to the carrier 86. The bell crank 141 has an abutment 153 adjacent its pivotal axis and presented by its outer arm and a pin 154 projects outwardly from the abutment. A cap or nut 155 is adjustably threaded on the outer part of the pin 154. A helical spring 156 surrounds the pin 154 and is arranged under compression between the nut 155 and the inner arm of the lever 150. The nut 155 is preferably knurled to be readily manually adjusted and may be recessed to receive a part of the spring 156.

The spring 156 arranged under compression between the nut 155 and the lever 150 forms a yieldable movement transmitting element. When the bell crank 141 is pivoted in a direction to shift the gripping means 14 outwardly or away from the tie forming means 16 the spring 156 serves to resist relative pivoting between the lever 150 and the bell crank 141 and thus serves as a yieldable movement transmitting element. Upon movement of the bell crank 141 in the other direction the inner arm of the lever 150 cooperates with the abutment 153 to provide a positive movement transmitting drive between the bell crank 141 and the lever 150.

The cams 143 and 144 are formed and timed to pivot the bell crank 141 in a direction to move the gripping means 14 outwardly or away from the tie forming means 16 following the above described wrapping of the wire W about the box B and following the projection and actuation of the gripping means 15. The outward movement of the gripping means 14 tensions the wire loop on the box B, that is, it tightens the wire loop on the box, taking up any slack there may be in the loop and causing the wire W to closely conform to the sides of the box. It is to be observed that the movement of the means 14 to tension the wire W is effected through the spring-loaded connection just described. The spring 156 yields when a suitable tension is put on the wire loop engaged about the articles or box B, yielding to prevent excessive tightening of the wire and to prevent breaking of the wire. By adjusting the nut 155 the tension put on the loop engaging about the box B may be regulated or varied. The first gripping means 14 dwells, following the tensioning of the wire on the box B as just described, that is, the cams 144 and 143 are formed to hold the means 14 stationary during the tie forming and wire severing operations.

The tie forming means 16 operates to twist together the overlapping portions of the wire loop engaged about the box B to secure the binding or loop to the box. The means 16 includes a twisting pinion 157 provided with a longitudinal wire receiving slot 158 of the usual form (see Figs. 13, 14 and 15 of the drawings). The pinion 157 is carried between spaced plates 159 on the bracket 85 and projects beyond the outer ends of the plates 159 to be free and exposed. Inwardly projecting bearing parts 160 on the plates 159 extend into the opposite ends of the pinion 157 and bearing blocks 160ᵃ on the plates 159 engage the external end parts of the pinion to rotatably support the pinion. The forward ends of the plates 159 and bearing parts 160 are cut away to leave the ends of the slot 158 open at the opposite ends of the pinion. The slot 158 is adapted to receive the overlapping parts of the wire box binding loop as illustrated in Fig. 13 of the drawings. When the pinion 157 is rotated, while the wire parts are held separated by the means 17, the overlapping parts of the wire are twisted together to form a tie in the wire loop. This operation is common to wire tying machines of the class provided by this invention.

The means for operating or rotating the twisting pinion 157 includes a sector gear 161 in the case 41. The gear 161 is pivotally supported by the shaft 122 and has an opening passing the shaft 78 with appropriate clearance (see Fig. 19). The sector gear 161 meshes with a pinion 162 to drive a gear 163 connected with the pinion. The gear 163 drives an idler gear 164 which in turn meshes with the twisting pinion 157. The idler gear 164 is carried by a shaft 165 supported by the bearing blocks 160ᵃ on the spaced plates 159 and the pinion 162 and gear 163 are carried by a parallel shaft 166. The pinion 162 may be fixed to or formed integral with the gear 163. The shaft 166 is supported by suitable bearing parts on the bracket 85. Cam means is provided to control and operate the sector gear 161. Complementary cams 167 and 168 are keyed to the shafts 76 and 78, respectively, and cooperate with a roller 169 rotatably mounted on the sector gear 161 to positively turn the gear in both directions. The cams 167 and 168 are shaped and set to cause rotation of the twisting pinion 157 through several complete revolutions to form the tie in the wire W. This tie forming operation is subsequent to the projection of the means 17, as will be later described. The twisting pinion 157 is rotated to form the tie and stops in a position where its slot 158 is facing downwardly and the wire is severed at this time. The turning of the pinion 157 is then continued to bring the cut ends of the wire to positions where they face the box B. This brings the pinion 157 to a position where its slot is above or beyond a horizontal plane and the cams 167 and 168 are formed to cause the pinion 157 to stop in this position and then turn back to bring the slot 158 to a substantially horizontal outwardly facing position. The reversed turning of the pinion 157 relieves the torque on the tied wire loop and the pinion 157 so that the tie is freed for easy ejection from the slot 158. The slight reversal of the pinion 157 does not untwist the tie but leaves a set, tight twist in the wire W.

The means 17 is operable to engage between the parts of the wire W adjacent the ends of the twisting pinion 157 prior to and during the tie forming operation to assure the correct twisting or tying of the wire, is operable to sever the end portions of the wire adjacent the tie subsequent to the formation of the tie and is operable to eject the tie from the pinion slot 158 following the severing operation. Due to the looping or wrapping of the wire W about the box B and the tensioning of the wire loop onto the box the loop portions of the wire W pass upwardly around the box B at an angle to the horizontal while the wire portion 130 and the wire portion extending to the gripper 14 extend outwardly and downwardly at angles to the horizontal. The means 17 includes parts projectable outwardly between the angularly related wire parts to maintain the wire parts separated and in the angular relation.

These wire separating parts are in the nature of somewhat pointed fingers 170 projecting from the outer or forward ends of shiftable blocks 171. The blocks 171 are shiftably guided between the plates 159 and similar plates 172 on the bracket 85 to have their forward parts adjacent the opposite ends of the twisting pinion 157. The fingers 170 are adapted to engage between the angularly related parts of the wire W adjacent the opposite ends of the twisting pinion 157. The lower sides of the fingers 170 may be flat and substantially horizontal while the upper sides of the fingers slope upwardly and inwardly to outwardly facing shoulders 173 on the blocks 171. Notches 174 are provided in the lower sides of the fingers 170 to receive the wire W for the severing operation, as will be later described.

The mechanism for operating the means 17 includes complementary cams 175 and 176 keyed to the shafts 76 and 78, respectively. A roller lever 177 is pivotally supported by the shaft 122 and projects upwardly in the case 41 adjacent the cams 175 and 176. A roller 178 is rotatably carried by the lever 177 to be engaged by the cams 175 and 176 so that the lever 177 is operated by the cams. A link 179 is pivotally connected to the upper end of the lever 177 and extends outwardly or rearwardly through the case 41 to a cross-head 180. The link 179 is guided in an opening 181 in the case 41 and is fixed to the cross-head 180. Rods 182 are connected to the cross-head 180 and extend forwardly through the case 41 to connect with the blocks 171. The cams 175 and 176 are shaped and set to cause the projection of the fingers 170 immediately following the above described tensioning of the wire W on the box B.

The fingers 170 remain projected during the tie forming operation and upon completion of the tie the cams 175 and 176 cause retraction of the blocks 171 and the fingers 170.

The retraction of the wire separating fingers 170 effects the severing of the free wire parts at the ends of the tie. Knife plates 183 of suitable hardened material are set in the outer forward corner parts of the plates 159. The knife plates 183 are in cooperative relation to the wire receiving notches 174. When the blocks 171 are retracted as above described the wire carrying notches 174 cooperate with the knife plates 183 to sever the wire. Fig. 14 illustrates the condition of the parts immediately following the severing operation and shows the wire binding loop with the tie remaining intact, and shows the wire portion 130 and the wire tailing 184 cut free from the tie.

Immediately following the severing operation just described the means 17 serves to eject the tie from the twisting pinion 157. The cams 175 and 176 cooperate with the roller 178 to cause a second projection of the blocks 171 at the completion of the wire severing operation. When the blocks 171 are projected the shoulders 173 on the blocks 171 engage the wire of the box binding loop to move the tie forwardly out of the slot 158 of the pinion 157. The tension of the box binding loop causes the tie and the adjacent portion of the wire loop to snap upwardly clear of the pinion 157 to closely lie against the under side of the article or box B. It is to be observed that the holding means 9 is retracted at this time so that the object or box B is free to shift when the tie is ejected. Immediately following the ejection of the tie from the pinion 157 the cams 175 and 176 act on the roller 178 to cause retraction of the blocks 171 and the blocks remain retracted until the next tying operation.

The means 18 for rethreading the tie forming mechanism is a feature of the invention. The means 18 shifts and controls the first gripping means 14 following the tie forming, wire severing and tie ejecting operations to bring the first gripping means 14 to a position adjacent the second gripping means 15 to receive the cut end portion of the wire protruding from the means 15, then releases or frees the second gripping means 15 from the wire W and then brings the first gripping means 14 back to its original position to rethread the wire W through the twisting pinion 157 and thus condition the tie forming mechanism for the next operation.

The first gripping means 14 is restored to its initial position and is released to discharge the wire tailing 184 before it is actuated or shifted by the means 18 to rethread the machine. The above described cams 143 and 144 act on the roller 145 to shift the bell crank 141, the lever 150 and the carrier 86 to restore the gripping means 14 to the position it assumed before the wire wrapping operations started. A cam 185 is fixed to the shaft 78 and is engageable with a roller 186 carried by a lever 187 (see Fig. 12). The lever 187 is pivotally supported at an end of the case 41 and projects from the front of the case to be in the operative relation to the plunger 94 of the gripping means 14. A spring 188 is connected with the lever 187 to hold the roller 186 against the cam 185 and to return the lever 187 after actuation of the cam. The cam 185 is formed to swing the lever 187 upwardly to depress the plunger 94 to free the gripping jaw 90 from the wire W. This allows the wire tailing 184 to discharge from the gripping means 14. A spring arm or ejector 189 may be provided on the carrier 86 to eject the wire tailing 184 when the jaw 90 is released. The lever or pawl 97 is actuated by the spring 99 to engage its lug 98 in the teeth 92 when the jaw 90 is opened, as just described. The opening or releasing of the gripping means 14 and the ejection of the wire tailing 184 from the means 14 occurs during or following the restoration of the means 14 from its wire tensioning position to its initial position.

The rethreading means 18 includes a cam 190 keyed to the main shaft (see Fig. 21). A lever 191 is pivotally supported by the shaft 122 and carries a roller 192 engageable by the cam 190. A link 193 is pivotally connected with the upper end of the lever 191 and a spring 194 is connected with the link 193 to urge the roller 192 against the cam 190 and to return the lever 191 and the link 193, as will be apparent. A collar 195 has a sliding key connection 196 with the carrier 86 and has a pivotal connection 197 with the forward end of the link 193. The collar 195 is associated with one of the bearings 87 to be held against longitudinal movement thereby. Following the ejection of the wire tailing 184 from the means 14 the cam 190 pivots the lever 191 to move the link 193 and thus cause turning of the carrier 86. The carrier 86 is turned to swing the first gripping means 14 downwardly and outwardly out of alignment with the twisting pinion 157.

Immediately following the out swinging of the gripping means 14 the cams 143 and 144 cooperating with the roller 145 operate the bell crank 141 to shift the carrier 86 axially. This moves the gripping means 14 to a position in a vertical plane between the second gripping means 15 and the adjacent block 171 of the means 17. The cam 190 is shaped and timed to allow the spring 194 to shift the link 193 and turn the carrier 86 immediately following the horizontal shifting of the carrier and the gripping means 14. The turning of the carrier 86 brings the first gripping means 14 to a position in horizontal alignment with and in wire receiving relation to the second gripping means 15 (see Fig. 10). The jaw 90 of the first gripping means 14 is held open by the lug 98, as described above, and when the means 14 swings upwardly and inwardly the cut end portion of the wire W is received between the jaw 90 and the anvil part 89.

The means 18 further includes a control for actuating or releasing the jaw 90 of the gripping means 14 to grip the wire W and for immediately thereafter disengaging the gripping jaw 102 of the means 15 from the wire W. This control includes a dog 200 pivoted on the bracket 85 to project from the face of the machine (see Fig. 7). A notch 201 is provided in the under side of the dog 200. The control further includes a lever 202 pivoted on a projecting boss of a bearing 87. The lever 202 extends under the dog 200 and one end portion of the lever is received in the notch 201 to provide a connection between the lever and dog. A spring 203 acts on the lever 202 to urge the dog 200 to an up or inactive position. The end portion of the lever 202 most remote from the dog 200 is shaped to have engagement with a roller 204 on the above described pin 118. When the second gripping means 15 is active and in gripping engagement with the wire W the pin 118 is in the outer end of the slot 117 and the cooperation of the roller 204 with the lever 202 is such that the dog 200 is in its inactive or up position. A freely turnable roller 205 is carried by the gear 80 to project from one face thereof. The roller 205 is engageable with the lever 121 (see Fig. 22).

The roller 205 cooperates with the lever 121 following the above described operations to shift the link 120 and pivot the bell crank 119. This pivoting of the bell crank 119 first moves the pin 118 through the slot 117 without affecting the link 116, the link being held by the spring 70. The pin 118 thus moved through the slot 117 has its roller 204 act on the lever 202 to pivot the lever 202 and to pivot the associated dog 200. The dog 200 is pivoted downwardly to act on the projecting trigger part of the lever or pawl 97 of the first gripping means 14. This movement of the pawl 97 releases its lug 98 from the teeth 92 so that the spring 96 operates the jaw 90 into gripping cooperation with the wire W. Further movement of the bell crank 119 resulting from engagement of the roller 205 with the lever 121 brings the pin 118 against the inner end of the slot 117 so that the link 116 is moved. This movement of the lever 116 swings the jaw 102 of the gripping means 15 to a released position. From the above it will be observed that the first gripping means 14 is actuated to grip the wire W just before the second gripping means 15 is opened or released and that a single control serves to actuate the means 14 and to release the means 15.

The rethreading means 18 further provides for the freeing of the wire W from the released or opened gripping means 15. A cam 206 is keyed to the shaft 76 and a lever 207 is supported by the shaft 122 to be adjacent the cam 206, see Fig. 20. The upper end of the lever 207 has a pivotal connection 208 with the link 103 and lever 207 carries a rotatable roller 209 engageable by the cam 206. The cam 206 is engageable with the roller 209 to shift the body 100 of the means 15 forwardly. This forward movement of the gripping means 15 occurs immediately following the actuation of the gripping means 14 and the release of the gripping means 15. Simultaneously with the forward movement of the gripping means 15 the cam 190 acts on the roller 192 to turn the carrier 86, swinging the gripping means 14 downwardly and outwardly. During the outward movement of the second gripping means 15 the downward and outward swinging of the gripping means 14, which is in gripping engagement with the wire W, swings the wire free of the anvil part 101 of the means 15. The second gripping means 15 is moved to a retracted position following the disengagement of the wire W from it. A cam 210 is keyed to the shaft 78 and has a part cooperable with the roller 209 to move the second gripping means 15 to a fully retracted position following the disengagement of the wire W from the means 15. The spring latch 211 cooperates with the notch 212 to releasably latch the means 15 in its retracted position.

Following the active engagement of the first gripping means 14 with the cut end of the wire W and the subsequent downward swinging of the means 14 the rethreading means provides for the shifting of the gripping means 14 back across the front of the machine to the vertical plane of its initial position. The cams 143 and 144 are formed and timed to cause pivoting of the bell crank 141 and appropriate longitudinal movement of the carrier 86 to shift the gripping means 14 back to the vertical plane of its initial position. The gripping means 14 moving horizontally in front of the twisting pinion 157 draws the wire W along with it, the wire being entirely clear of the twisting pinion. When the gripping means 14 reaches the end of its horizontal return movement the spring 194 draws back the link 193 and turns the carrier 86 to swing the first gripping means 14 back to its initial active position in horizontal alignment with the twisting pinion 157. During the upward swinging of the gripping means 14 to its initial position the wire W snaps into the slot 158 of the twisting pinion 157. This completes the rethreading operation.

It is to be observed that the rethreading means 18 operates to move the first gripping means 14 along a predetermined path from its initial position to a position in wire receiving relation to the second gripping means 15, to reengage the gripping means 14 with the cut end portion of the wire W, to release the second gripping means 15 from the wire W and to then return the first gripping means 14 along the said predetermined path to its initial active position. The rethreading of the tie mechanism is entirely automatic and requires no manual manipulation of the wire W or other parts.

The invention includes means for reconditioning the bell crank 124 so that it may latch the jaw 102 of the second gripping means 15 open when the means 15 is released from the wire W as described above in connection with the rethreading operations. A rotatable roller 213 projects from the end of the collar 135 of the clutch C and is engageable with a lever 214, see Fig. 4. The lever 214 is supported by a suitable bracket 215 and is spring-urged to a position for engagement by the roller 213. The lever 214 has an end part adapted to cooperate with the control member 127 to pivot the same downwardly. The roller 213 pivots the lever 214 shortly after the second gripping means 15 has been projected to initially grip the wire W. When the control member 127 is moved downwardly by the lever 214 the notch 128 is disengaged from the lug 129 and the shoulder 140 is freed from the arm 139, see Fig. 6. The spring 126 then urges the control member 127 toward its initial position. During the restoration of the control member 127 the bell crank 124 is pivoted to a position to engage under the bell crank 119. Accordingly, when the jaw 102 of the means 15 is opened, by the action of the roller 205 and the movement of the bell crank 119, the active upper end of the bell crank 124 moves up behind the bell crank 119 to latch the jaw 102 open. The jaw 102 of the gripping means 15 remains open until the cam face 69 acts on the fingers 71 to operate the control member 127 and pivot the bell crank 124 when the ring 11 approaches the end of its wire wrapping movement. It is to be observed that the restoration of the control member 127 frees the arm 139 so that the clutch blade 134 is conditioned for re-engagement with the clutch dog 136. The lug 129 engaging the upper edge of the control member 127 holds the member free of the arm 139 on the clutch control shaft 133.

The machine includes an interlocking means or pedal control for preventing rotation or actuation of the wire wrapping ring 11 during the tie forming operations. This pedal control includes a lever 217 freely pivoted on the yoke shaft 52 and extending to the clutch C. A spring 218 normally urges the lever 217 upwardly. The spring 218 may be utilized to hold the above described lever 214 in position. The lever 217 is provided with a shoulder 219 adapted to engage a latch part 220 on the upper end of the lever 60. The lever 60 is fixed to the shaft 61 and the shaft extends under the case 41. A collar 221 is fixed to the shaft 61 and has a projecting finger 222 engageable by a collar 223 on the above described link 108. When the cam face 69 cooperates with the shoe 112 to project the gripping means 15 the collar 223 acts on the finger 222 to turn the shaft 61. This turns the lever 60 to bring the latch part 220 into latching engagement with the shoulder 219. The cooperation of the latch part 220 with the shoulder 219 holds the lever 60 in a position where the cam part or finger part 65 is clear of the lever 64 and the latch 75. Accordingly, the pedal 54 is disengaged from the means for shifting the clutch yoke 51 at the time of projection of the second gripping means 15 and at the time of completion of the wire wrapping rotation of the ring 11. Manual operation of the pedal 54 after the tie forming operations have begun cannot engage the driving clutch for the ring 11 as movement of the pedal link 55 is not transmitted to the lever 64 or the latch 75, the part 65 being clear of the lever and latch.

Near the end of the tie forming operations and when the dog 136 approaches the blade 134 of the clutch C the roller 213 cooperates with the upper end of the lever 217 to pivot the lever downwardly. This downward pivoting of the lever 217 is accompanied by disengagement of the latch part 220 from the shoulder 219, whereupon the spring 63 returns the lever 60 to bring the part 65 to its active position above the lever 64 and the latch 75. Thus the pedal means for engaging the clutch of the ring driving means 13 is reconditioned for operation just before the clutch C is disengaged. When the dog 136 engages the blade 134 it has camming engagement with the blade and is retracted to a position where it is freed from the drum 138 and the notches 137. This disengages the clutch C and completes the cycle of operation of the tie forming mechanism. The engagement of the dog 136 with the blade 134 may impose a substantial endwise force on the shaft 133 and thrust bearings 226 and a spring 225 may be associated with the shaft 133 to cushion this action. The spring 225 silences the clutch C. The spring 225 is compressed when the dog 136 is cammed in by the blade 134 and when the dog is freed from its notch 137 the momentum of the dog and the return of the compressed spring 225 further depress the dog so that it is fully clear of the notches 137 in the rotating drum 138. The dog 136 is stopped on a substantially horizontal face at the base of a stop shoulder 300 on the blade and remains in this position until the clutch C is again engaged at the next cycle of operation.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. In a tying machine, a bodily movable first gripper for holding the free end of a wire, a second gripper for stationarily anchoring the supply portion of the wire, means for bodily moving the first gripper to tension the wire while said supply portion remains stationarily anchored in the second gripper, tying means between the grippers for forming a tie in the tensioned wire, and means for severing the tie from said free end held by the first gripper and said supply portion anchored by said second gripper.

2. In a tying machine, a first gripper for holding the free end of a wire, means for supporting the first gripper for bodily movement, a second gripper for stationarily anchoring the supply portion of the wire, tying means between the grippers for forming a tie in overlapping portions of the wire, severing means for severing the tie from the wire portions held by the grippers, and means for operating and bodily shifting said first gripper to receive said supply portion presented by the second gripper and to grip the same and then return to its initial position to rethread the tying means for the next operation.

3. In a tying machine, a movable first gripper for holding the free end of a wire, means for supporting the first gripper for bodily movement, a second gripper for stationarily anchoring the supply portion of the wire, means for bodily moving the first gripper to tension the wire while said supply portion remains stationarily anchored in the first gripper, tying means between the grippers for forming a tie in the tensioned wire, severing means for cutting the tie free from said free end held by the first gripper and said supply portion anchored by said second gripper, and means for operating and shifting said first gripper to receive said supply portion presented by said second gripper and to grip the same and then return to its initial position to rethread the tying means for the next operation.

4. In a tying machine, wire tying means, wire gripping means at opposite sides of the tying means, one of the gripping means serving to temporarily fixedly anchor the supply portion of the wire after the wire has been trained about the object to be tied, the other gripping means gripping the free end of the wire, means for supporting said other gripping means for bodily movement, means for bodily shifting said other gripping means to tension the wire on the object preparatory to the tying operation and while the supply portion of the wire remains fixedly anchored in the first named gripping means, means operable at the completion of the tying operation for severing the supply portion of the wire from the tie, and means for shifting and operating the said other gripping means to receive the cut end portion of the wire from the first named gripping means and then return to its initial position to rethread the tying means.

5. In a tying machine, two spaced wire gripping means, wire tying means between the gripping means, one of the gripping means serving to fixedly anchor the supply of a wire which has been trained about an object to be tied, means for supporting the other gripping means for bodily movement along an axis and serving to hold the free end of the wire, and means for bodily moving said other gripping means along said axis and away from the tying means while said supply portion remains fixedly anchored in the first named gripping means to tension the wire on the object.

6. In a tying machine, a first gripping means for holding the free end of a wire trained about an object, a second gripping means for holding the supply portion of the wire, tie forming means between the two gripping means for forming a tie in overlapping parts of the wire, severing means for cutting the tie free from said free end and said supply portion, means for moving the first gripping means from its initial position at one side of the tie forming means to the second gripping means to grip the wire presented by said second gripping means and for moving the first gripping means back to said initial position to rethread the wire through the tie forming means, and means for releasing the second gripping means when the first gripping means has engaged the wire presented by the second gripping means.

7. In a tying mechanism for tying a wire trained about an object, a first gripper for initially fixedly anchoring the free end of the wire, a second gripper, tie forming means spaced between the grippers, means for projecting and operating the second gripper to grip the supply portion of the wire for the tying operation, means for cutting the tie free from the wire held by the grippers at the completion of the tying operation, means for releasing the first gripper to free the wire tailing therefrom, means for imparting a shuttle motion to the first gripper to move the same from its initial position to second gripper and then back to its initial position, and means for actuating the first gripper to grip the wire presented by the second gripper when the first gripper is at the second gripper and for releasing the second gripper.

8. In a tying mechanism for tying a wire trained about an object, a first gripper for initially fixedly anchoring the free end of the wire, a second gripper, tie forming means spaced between the grippers, means for projecting and operating the second gripper to grip the supply portion of the wire for the tying operation, means for cutting the tie free from the wire held by the grippers at the completion of the tying operation, means for releasing the first gripper to free the wire tailing therefrom, means for imparting a shuttle motion to the first gripper to move the same from its initial position to second gripper and then back to its initial position, means for actuating the first gripper to grip the wire presented by the second gripper when the first gripper is at the second gripper and for releasing the second gripper, and means for retracting the second gripper.

9. In a machine having means for training the supply portion of a wire around an object, the combination of, a movable gripping means for initially anchoring the free end of the wire, a second gripping means, tie forming means spaced between the two gripping means, means for operating the second gripping means to grip the supply portion of the wire when the wire has been trained around the object, means for operating the tie forming means when the free end and supply portions are held by the gripping means, means for severing the supply portion of the wire from the tie, means for shifting the movable gripping means from its initial position to the second gripping means to receive the newly cut free end of the wire therefrom, for shifting the movable gripping means back to its initial position and for retaining the movable gripping means in said initial position for the next operation, and means for releasing the second gripping means when the movable gripping means has obtained a grip on the newly cut free end of the wire.

10. In a tying mechanism for tying a wire trained about an object, a first gripper supported for movement along an axis and for turning about said axis, a second gripper shiftable transversely of said axis, means for controlling the first gripper to stationarily anchor the free end of the wire, means for controlling the second gripper to grip the supply portion of the wire, tying means between the two grippers for making a tie in the wire, means for severing the tie from the supply portion of the wire, means operable at the completion of the tie for releasing the first gripper, for swinging the first gripper about said axis, for moving the first gripper along said axis, for swinging the first gripper about said axis to the second gripper, for swinging the first gripper away from the second gripper, for moving the first gripper back along said axis and for swinging the first gripper back to its initial position, and means for actuating the first gripper while at the second gripper to receive the newly cut free end of the wire from the second gripper so that the wire is rethreaded in the tying means when the first gripper moves back along said axis.

11. In a tying mechanism for tying a wire trained about an object, a first gripper supported for movement along an axis and for turning about said axis, a second gripper shiftable transversely of said axis, means for controlling the first gripper to stationarily anchor the free end of the wire, means for controlling the second gripper to grip the supply portion of the wire, tying means between the two grippers for making a tie in the wire, means for severing the tie from the supply portion of the wire, means operable at the completion of the tie for releasing the first gripper, for swinging the first gripper about said axis, for moving the first gripper along said axis, for swinging the first gripper about said axis to the second gripper, for swinging the first gripper away from the second gripper, for moving the first gripper back along said axis and for swinging the first gripper back to its initial position, and means for actuating the first gripper while at the second gripper to receive the newly cut free end of the wire from the second gripper and for releasing the second gripper so that the first gripper carries the cut free end back to said initial position.

12. In a tying mechanism for tying a wire trained about an object, a first gripper supported for movement along an axis and for turning about said axis, a second gripper shiftable transversely of said axis, means for controlling the first gripper to stationarily anchor the free end of the wire, means for controlling the second gripper to grip the supply portion of the wire, tying means between the two grippers for making a tie in the wire, means for severing the tie from the supply portion of the wire, means for yieldingly urging the first gripper along said axis away from the tying means to tension the wire for the tie, means operable at the completion of the tie for releasing the first gripper, for swinging the first gripper about said axis, for moving the first gripper along said axis, for swinging the first gripper about said axis to the second gripper, for swinging the first gripper away from the second gripper, for moving the first gripper back along said axis and for swinging the first gripper back to its initial position, and means for actuating the first gripper while at the second gripper to receive the newly cut free end of the wire from the second gripper so that the wire is rethreaded in the tying means when the first gripper moves back along said axis.

13. In a tying mechanism for tying a wire trained about an object, a first gripper supported for movement along an axis and for turning about said axis, a second gripper shiftable transversely of said axis, means for controlling the first gripper to stationarily anchor the free end of the wire, means for controlling the second gripper to grip the supply portion of the wire, tying means between the two grippers for making a tie in the wire, means for severing the tie from the supply portion of the wire, means operable at the completion of the tie for releasing the first gripper, for swinging the first gripper about said axis, for moving the first gripper along said axis, for swinging the first gripper about said axis to the second gripper, for swinging the first gripper away from the second gripper, for moving the first gripper back along said axis and for swinging the first gripper back to its initial position, and a single control for releasing the second gripper and for actuating the first gripper to grip the newly cut free end of the wire when the first gripper is at the second gripper so that the wire is rethreaded in the tying means when the first gripper moves back to said initial position.

14. In a tying mechanism of the character described, a gripping means, and means supporting the gripping means for bodily movement along an axis and for swinging about said axis including an elongate carrier supporting the gripping means, and bearing means mounting the carrier for longitudinal movement and for turning movement about its longitudinal axis.

15. In a tying mechanism of the character described, a gripping means, means supporting the gripping means for bodily movement along an axis and for turning about said axis, means for imparting such bodily movement and turning movement to the gripping means, and means for actuating the gripping means when in different positions along said axis.

HERBERT HARVEY.